Jan. 30, 1951 T. A. CAMPBELL 2,539,989
LUBRICANT RECEIVING FITTING
Filed June 17, 1946
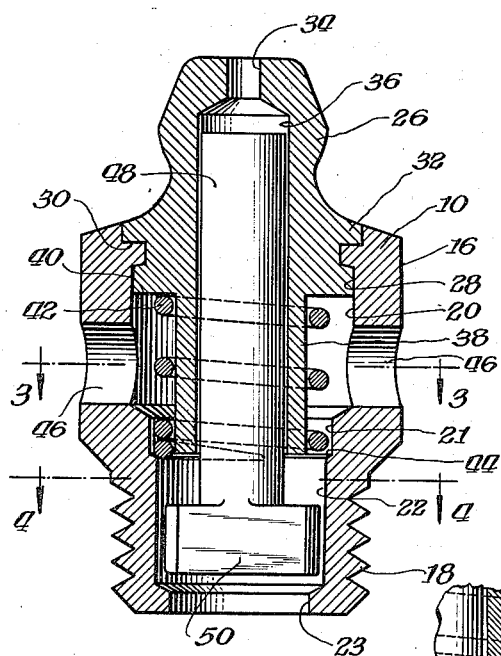
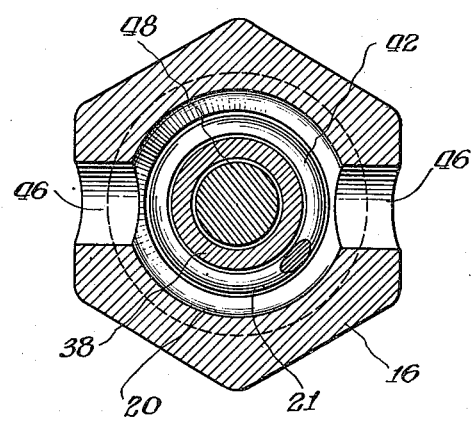
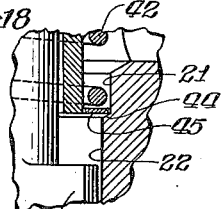
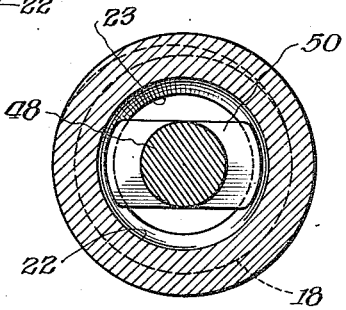
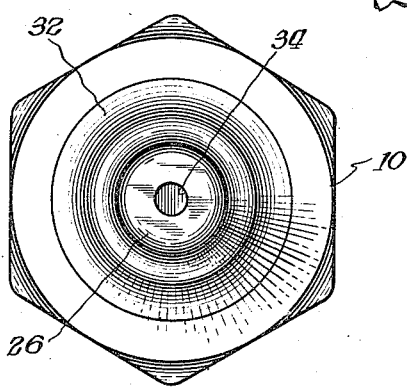
Inventor:
Thomas Arthur Campbell
By:
Hinkle, Horton, Ahlberg, Hausmann & Kupper
Attorneys.

Patented Jan. 30, 1951

2,539,989

UNITED STATES PATENT OFFICE 2,539,989

LUBRICANT RECEIVING FITTING

Thomas Arthur Campbell, Chicago, Ill., assignor to Stewart-Warner Corporation, Chicago, Ill., a corporation of Virginia Application June 17, 1946, Serial No. 677,122

1 Claim. (Cl. 184—105)

My invention relates generally to lubricant receiving fittings for high pressure lubricating systems, and more particularly to fittings designed to limit the pressure at which lubricant may be supplied to a bearing.

In many forms of bearings, such as those of centrifugal water pumps, packings or seals may be damaged if the lubricant is supplied to the bearings thereof under greater than a predetermined pressure.

It is therefore the primary object of my invention to provide an improved lubricant receiving fitting for application to such bearings through which lubricant may be supplied from a high pressure source and yet prevent the pressure within the bearing from exceeding a predetermined maximum value.

A further object of my invention is to provide an improved lubricant receiving fitting in which the rate of flow of lubricant through the fitting is limited.

When bearings having pressure relief fittings applied thereto are lubricated from a power operated compressor, the compressor builds up a pressure of 6000 or 7000 p. s. i., and when the coupler is attached to the fitting and the lubricant control valve opened, a sudden surge of lubricant at these high pressures flows into the fitting and bearing. This initial high pressure is built up so rapidly that the pressure relief valve may not operate rapidly enough to relieve the pressure, and as a result the bearing is very likely to be subjected to excessive pressures.

It is therefore one of the primary objects of the invention to provide means in the fitting which will prevent the sudden increase or surge of lubricant under high pressure at the inlet of the fitting from being transmitted to the bearing, and this is accomplished by providing a highly restricted lubricant flow passageway between the inlet of the fitting and the outlet thereof, which is in communication with the bearing cavity.

Other objects will appear from the following description, reference being had to the accompanying drawings, in which:

Fig. 1 is a central vertical sectional view of the fitting, shown to an enlarged scale;

Fig. 2 is a top plan view thereof;

Figs. 3 and 4 are transverse sectional views taken on the lines 3—3 and 4—4, respectively, of Fig. 1; and Fig. 5 is a fragmentary sectional view of a modified form of the invention.

The fitting disclosed in this application is an improvement of the fitting shown in my copending application Serial No. 617,235, filed September 19, 1945, issued as Patent No. 2,497,758 on February 14, 1950. It is also an improvement on the fitting shown in the patent to Ernest W. Davis, No. 2,087,085.

As shown in the drawings, the fitting comprises a body 10 having a hexagonal wrench engaging portion 16 and a threaded shank 18 by which the fitting is secured to the bearing to be lubricated. The body 10 has axial counterbores 20, 21, 22, and 23. A head 26, shaped for engagement with the nozzle or coupler of a lubricant compressor, has a cylindrical portion 28 of reduced diameter, an external annular groove 30, and a swaging shoulder 32. The head 26 is preferably made of a harder material than the body 10 so that when the head is pressed into the upper end of the bore 20, the shoulder 32 of the head will swage a portion of the body at the upper end of the bore 20 into the groove 30, thereby securely locking and sealing the head 26 to the body 10.

The head 26 has an inlet opening 34 which leads into a bore 36. The lower end of the head 26 is of reduced diameter to form a tubular portion 38 and to provide a shoulder 40 for engagement by the upper end of a helical spring 42. The lower end of the spring 42 rests upon a shoulder 44 between the bores 21 and 22, and its external diameter is but slightly less than that of the bore 21. The lower turn of the spring 42 is preferably ground flat, and a thin flat washer 45 may be inserted, as shown in Fig. 5, whenever it is required that a predetermined pressure be retained in the bearing without excessive leakage through the pressure relief passageway. A pair of outlet ports 46 extends radially into the bore 22 and thus provides ports through which excess lubricant supplied to the fitting may be discharged to the atmosphere.

Within the bore 36 there is a restriction pin 48 having a T-shaped head 50 located within the bore 22. There is adequate clearance between the pin 48 and bore 36 to permit flow of lubricant through the fitting at a reasonable rate, the clearance being in the order of .002 to .015″, although this clearance may be varied, by providing a pin of a different size, when lubricants of high viscosity are to be used, or when the fitting is to be used for a bearing requiring a large quantity of grease.

In using the fitting, the coupler of the lubricant compressor or other source of lubricant under pressure, is connected to the head 26 in a manner fully disclosed in the patent to Joseph Bystricky, No. 2,016,809, and lubricant is pumped into the bearing. The rate at which it may be supplied to the bearing cavity to which the fitting is connected will depend mainly upon the effective size of a passageway between the pin 48 and the walls of the bore 36. After the bearing cavity is filled or substantially filled with the lubricant, back pressure will build up against the lower end of the spring 42 and compress the latter to permit relatively free escape of surplus lubricant through the bores 21 and 29 and outlet ports 46. The operator, knowing that lubricant is flowing from the ports 46, is thus apprised of the fact that the bearing cavity has been filled with lubricant under the desired maximum pressure, and the supply of lubricant is therefore discontinued.

When the fitting is lubricated from a compressor which operates to maintain a predetermined high pressure at its outlet, such as 6000 or 7000 p. s. i., and such compressor is connected to the fitting and the flow control valve opened rapidly, lubricant will flow in a sudden surge into the inlet end of the fitting, and if the highly restricted passageway between the pin 48 and bore 36 were not provided, such high pressure would be practically instantaneously communicated to the bearing cavity, due in part to the inertia of the rapidly flowing grease (water hammer effect) and partly to the fact that the inertia of the spring 42 would not permit relief of the pressure during such initial surge. The presence of the pin 48 in the bore 36 provides a sufficient restriction between the inlet and outlet of the fitting that the energy of the initial pressure surge is dissipated, so that time is afforded for the operation of the pressure relief valve (the lower turns of the spring 42).

The effective cross sectional area of the space between the wall of the bore 21 and the external surface of the tubular portion 38 of the head of the fitting is sufficiently greater than the cross sectional area of the space between the pin 48 and the bore 36 that the spring 42 will effectively determine the maximum pressure which can be built up in the bearing cavity. Thus the fitting forms a convenient and simple safety means to prevent supplying lubricant to the bearing at an excessive pressure. In this way the operator is prevented from harming bearings which are subject to damage by excessive pressures. In many forms of machinery, particularly those used for textile and food processing, it is essential to limit the pressure at which the lubricant is supplied to the bearings in order to prevent the lubricant from being discharged from the bearings. Such excess lubricant might readily spoil the textile or food being processed.

The pin 48 is free to move longitudinally to a limited extent and thus may be forced upwardly by the back pressure of the lubricant in the bearing. The pin 48 thus may perform the additional function of a check valve to close the inlet port 34 after the supply of lubricant to the fitting has been discontinued and thereby prevent any material quantity of lubricant from oozing from the port 34.

While I have shown and described perferred embodiments of my invention, it will be apparent that numerous variations and modifications thereof may be made without departing from the underlying principles of the invention. I therefore desire, by the following claim, to include within the scope of the invention all such variations and modifications by which substantially the results of the invention may be obtained through the use of substantially the same or equivalent means.

I claim:

A lubricant receiving fitting for attachment to a bearing and for coupling to a source of lubricant under pressure, comprising a body having a plurality of counterbores of progressively decreasing diameter, a head secured in the largest of said counterbores, said head having an inlet port and having a tubular extension projecting a substantial distance into the fitting body, the lower end portion of said tubular extension providing with one of the counterbores in the body a relatively narrow annular passageway, a coil spring having the lower turn thereof substantially filling the passageway, means in the body providing free communication between the passageway and the atmosphere, and a pin located at least in part in the tubular extension of the head and forming therewith a lubricant flow restricting passageway, said pin being freely movable with respect to the body and head to a limited extent, and being operable as a check valve to close the inlet port in the head of the fitting against substantial return flow of lubricant.

THOMAS ARTHUR CAMPBELL.

REFERENCES CITED

The following references are of record in the file of this patent:

UNITED STATES PATENTS

| Number | Name | Date |
|---|---|---|
| 1,004,986 | Burkett | Oct. 3, 1911 |
| 1,772,107 | Nelson | Aug. 5, 1930 |
| 1,934,572 | Sutton | Nov. 7, 1933 |
| 2,017,978 | Lapp | Oct. 22, 1935 |
| 2,217,739 | Ehnts | Oct. 15, 1940 |
| 2,225,724 | Thomas et al. | Dec. 24, 1940 |
| 2,232,359 | Barks | Feb. 18, 1941 |